United States Patent Office 2,976,395
Patented Mar. 21, 1961

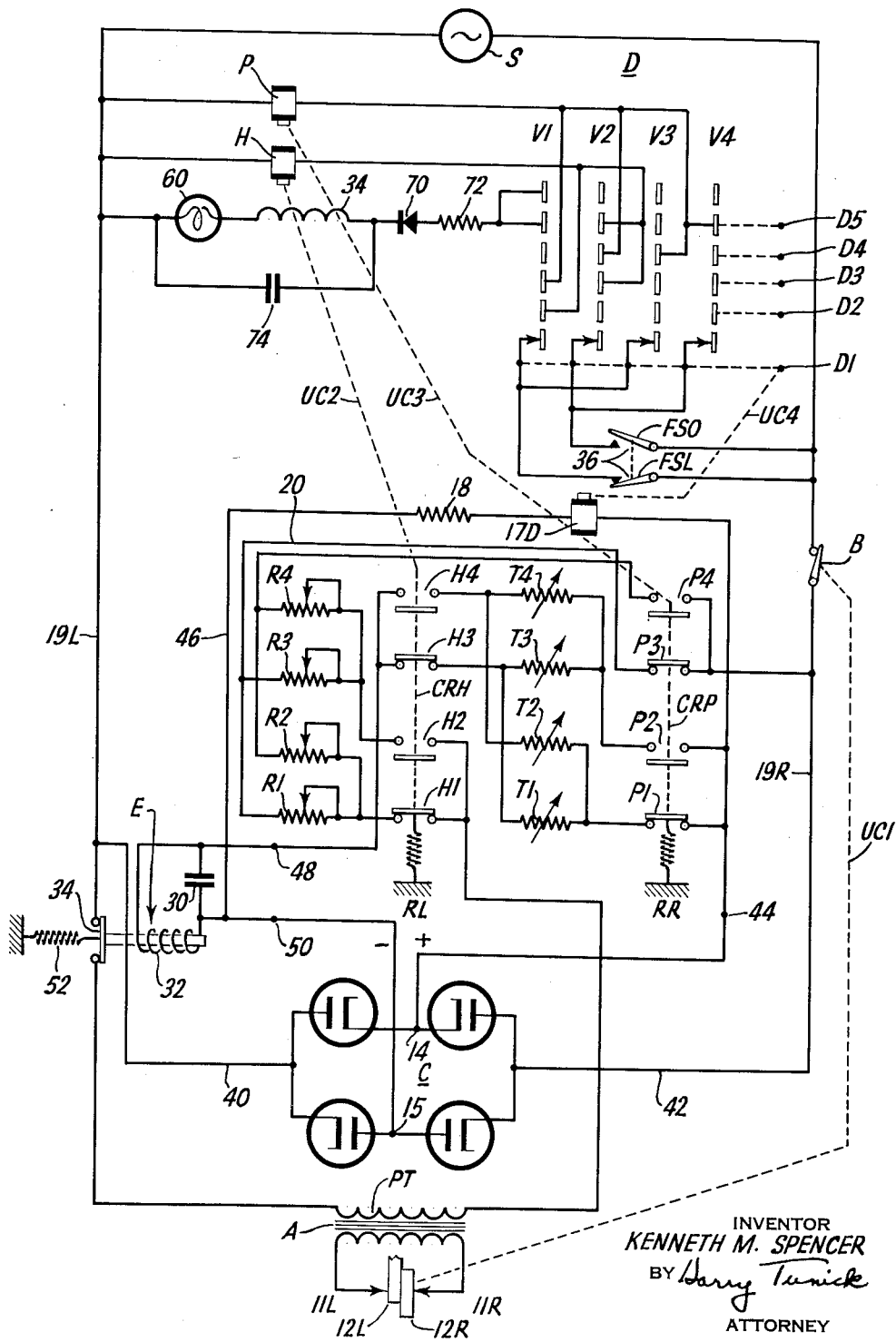

2,976,395
ELECTRICAL WELDING APPARATUS

Kenneth M. Spencer, Galeton, Pa., assignor, by mesne assignments, to Sylvania Electric Products Inc., Wilmington, Del., a corporation of Delaware Filed Jan. 14, 1959, Ser. No. 786,788

5 Claims. (Cl. 219—108)

My present invention relates to electrical welding apparatus in which welds are produced by the flow of electric currents.

In the manufacture of certain types of apparatus, for example, electrode assemblies for electron tubes, it is necessary to make a number of different welds in sequence, each weld requiring, because of differences in material and size thereof, heating currents of different values and welding times of different durations.

It is an object of my present invention to provide new, useful and improved welding apparatus in which a sequence of welds can readily be produced and reproduced, each weld operating, if desired, with a different value of heating current and with a different time duration of flow of heating current. A further object of the invention, is to provide an arrangement wherein the sequence of welds is automatically repeated and wherein, nevertheless, under control of the operator, a welding operation may be repeated before going on with the welding sequence.

Briefly, in a preferred form of my invention, I provide a power supply switch which is uni-controlled with welding electrodes. When the welding electrodes are brought into contact with the work or parts to be welded, the power supply switch is automatically closed and power is supplied to the welding electrodes. Simultaneously, power is supplied to a rectifier, the rectified current of which is used, after a predetermined time interval has elapsed, to break the power circuit to the welding electrodes thereby ending the welding operation. A series or bank of resistors is provided, each resistor of which is adapted to be selectively connected with the rectifier circuit in such a way that, depending upon the resistor selected and connected into circuit, the time duration of welding current flow is preset. Similarly, a bank or series of resistors is provided, each resistor of which is adapted to be selectively and serially connected in the power supply circuit for the welding electrodes to control the value of the heating current flow therethrough.

Further, in accordance with the present invention, a switching system is provided including relays and a stepping switch for sequentially connecting into circuit a resistor from each of the series of timing and heating resistors. Connection of a new combination of resistors into circuit automatically takes place when the power supply switch is opened. There is also provided in accordance with the present invention, an arrangement in the form of a manually-operated switch which enables the operator to interrupt the welding sequence and repeat a weld, if desired, but nevertheless, enabling the automatic, selective, welding sequence to continue after interruption and repetition of the weld.

One form of my invention, wherein a series of welds of different "heats" and "times" are made, is diagrammatically illustrated in the accompanying drawing.

Referring to the drawing, when the welding electrodes 11L and 11R are moved towards each other and brought into contact with the work or parts to be welded, namely parts 12L and 12R, power supply switch B is automatically closed. This follows since switch B is interlocked with, and uni-controlled by, the welding electrodes 11L and 11R. When the welding electrodes are moved apart and removed from the work to be welded, it also follows that power supply switch B is opened. Now, when the power supply switch B closes, alternating heating current from the source S is fed to the welding transformer A. The value of the heating current fed to the transformer is dependent upon which one of the welding or heating current limiting resistors R1–R4 is in series with the primary PT of the welding transformer A. In the initial or starting position illustrated, R1 is the current controlling or energizing resistor connected in series with the prmary of the welding transformer A.

Simltaneously, with the closure of switch B, alternating power from source S is fed to the rectifier C. After a time interval, determined by one of a series of timing resistors, which will be described shortly, current from the rectifier C flows through the solenoid 32 of the solenoid actuated switch E, breaking the connection from power line 19L to the primary of the welding transformer A by opening contacts 34 of switch E. The time subsequent to the closure of power supply switch B, when contacts 34 are opened to remove power from the welding electrodes is determined by which one of the time constant or timing resistors T1–T4 is in circuit with the condenser 30 shunting the solenoid 32 of solenoid actuated switch E. As shown, resistor T1 is initially the timing resistor which controls or delays the opening of contacts 34 through which power is fed to the primary of welding transformer A.

It should also be noted that not only is the rectifier C connected to the solenoid controlled switch E, but rectifier C also energizes relay coil 17D which acts to set up for operation stepping switch D. In other words, current flow through relay coil 17D "cocks" stepping switch D for movement to its next position, the actual movement taking place when current flow through coil 17D is removed or broken.

After the first weld is completed, which occurs when switch E removes power from welding transformer A, the welding electrodes 11L, 11R are opened which action also opens switch B. As a result, rectified current is no longer produced by rectifier C, and no longer flows through the solenoid of switch E. The latter, therefore, closes, i.e., contacts 34 close. Also cutting off of the rectified current de-energizes relay coil 17D. This causes stepping switch D to move to its next position; i.e., from position D1 to position D2. This type of stepping switch and its action are known to those skilled in the art of stepping switches, and therefore, need not be described in detail here.

To continue, with the stepping switch in the position D2, when the welding electrodes are closed down upon the next pair of parts to be welded, switch B uni-controlled therewith is again closed and, because of the connections made by the stepping switch D in its position D2, relay coil H is energized with alternating current from the power lines 19L and 19R pulling up the contacts of the left-hand bank of relay contacts RL. Under this condition, the amount of heating current flowing through the welding transformer is determined by resistor R3 and the time of heating is determined by resistor T2; for, the latter determines the time constant of the circuit, now consisting of condenser 30 and timing resistor T2, shunting solenoid coil 32. In this way a new time interval is set for switch E to remain closed subsequent to a second closing of power supply switch B and thus the time of flow of current making the second weld is preset.

It should be noted also, that with the second closing of switch B, rectified current is again supplied to relay coil 17D to ready stepping switch D for further activation. This takes place when switch B is opened, and current through relay coil 17D is cut off which causes stepping switch D to move to contact position D3.

When the third pair of parts are inserted into the apparatus and the welding electrodes brought into contact therewith, switch B is also automatically closed for the third time. When this occurs, because of the position of the stepping switch D in position D3, relay coil P is energized with current from source S, pulling up relay contacts RR. Also, it should be noted, that in position D3, relay contacts RL are released to assume their initial or "down" position. As a result, on the third closure of switch B, the heating current is determined by resistor R2 in series with the primary PT of welding transformer A and the time during which the welding current is permitted to flow is determined by timing resistor T3 now in series with condenser 30 shunting solenoid 32; i.e., after a time interval determined by resistor T3, the voltage across solenoid E builds up to a value to cause enough rectified current to flow through coil 32 as to cause contacts 34 to open breaking the connection to the power supply S.

After completion of the third weld and a fourth pair of parts are brought into contact with the welding electrodes, stepping switch will be in position D4, wherein it will be noted, both relay coils H and P are energized with alternating current derived from source S and both control relays RL and RR are pulled up. As a result of this, heating resistor R4 will be in circuit with the welding transformer A and timing resistor T4 will control the time duration of current flow for the fourth weld.

When the welding electrodes are opened to remove the parts involved in the fourth weld, the contacts of stepping switch D are moved to position D5, connecting rectifier 70 via voltage dropping resistor 72 to source S, causing rectified current, smoothed by condenser 74 to flow through reset coil 34. The action of current flow in reset coil 34 is to bring the contacts of stepping switch D immediately to their initial or starting position D1. In this way, the apparatus is set up to repeat the sequence of welds of different "heats" and times.

In the event that the operator misses a weld and it is desired to re-weld with the preset heating current and time of flow of the same, the foot switch 36 is depressed which causes foot switch contact FSL to open and contact FSO to close. As a result, switch D is prevented from advancing and welding is repeated under conditions previously desired for the "missed" weld. This follows since depressing the foot switch, switches control from the vertical bank of contacts V1 and V3 to the vertical banks V2 and V4 which are wired one sequence behind vertical banks V1 and V3. Also, it should be noted that actuation of foot switch 36 interrupts and prevents the stepping switch D from advancing.

To facilitate tracing and following through the circuits of the timing and heating current controlling resistors R and T, the following chart is given:

| Heating Current Resistor and Connecting Contacts | | | Relay Positions | | Timing Current Resistor and Connecting Contacts | | |
|---|---|---|---|---|---|---|---|
| | | | RL | RR | | | |
| P3 | R1 | H1 | Down | Down | P1 | T1 | H3 |
| P3 | R3 | H2 | Up | Down | P1 | T2 | H4 |
| P4 | R2 | H1 | Down | Up | P2 | T3 | H3 |
| P4 | R4 | H2 | Up | Up | P2 | T4 | H4 |

Also, to facilitate following the various circuits as outlined in the above chart, a typical "trace through" is as follows. It is assumed that the first weld is to be made and that the apparatus is in the condition illustrated.

For the first weld electrodes 11L and 11R are brought into contact with the work pieces 12L and 12R to be welded. Movement of the welding electrodes together causes closure of power supply switch B by the action of the uni-control linkage UC1. Welding current then flows through the primary PT of welding transformer A as supplied by power lines 19L and 19R connected to a source S shown as a 220 volt A.C. supply. The left hand terminal of primary transformer coil PT is connected to power connector or line 19L by way of closed contacts 34 of switch E. The right hand terminal of the primary coil PT is connected to power supply conductor 19R by way of relay contacts H1, welding current limiting resistor R1, connection 20 and closed contacts P3 of relay RR.

With switch B closed, alternating current is also supplied to rectifier C by way of conductors 40 and 42. Rectified current flows from rectifier terminal 14, through conductor 44, relay coil 17D, current limiting resistor 18 and conductor 46 back to rectifier terminal 15.

Rectified current also flows from rectifier terminal 14 through closed contacts P1 of relay RR through timing resistor T1, closed relay contacts H3 of relay RL through conductor 48 into the circuit consisting of condenser 30 and coil 32 back through conductor 50 to terminal 15 of rectifier C. The flow of current into condenser 30 is timed by resistor T1 and when the current flow into condenser 30 is such as to build up enough voltage across condenser 30, current flows through solenoid coil 32. Current flow through solenoid 32 opens contacts 34 against the action of spring 52 which tends to close contacts 34. The timing is such, as determined by the values of resistor T1 and condenser 30, that the weld is completed when solenoid 32 is energized to open contacts 34.

It should be noted that relay contacts H1–H4 carry welding current and should not be overloaded. Lamp 60, in series with reset coil 34 may be provided as an indicator lamp and may also be used to limit current flow through the reset coil. Also, it should be noted the stepping switch need not be of the "straight line" type, but may be, if desired, a rotary stepping switch. Also, while rectifier C is illustrated as a full wave rectifier, other types may be employed such as, for example, a half wave rectifier.

Having thus described my invention, what I claim is:

1. Welding apparatus comprising welding electrodes adapted to be moved into contact with parts to be welded; a transformer for supplying welding current to the electrodes; means to provide alternating current power; a power supply switch, uni-controlled with said electrodes so as to be closed when said electrodes are moved into welding position and opened when said electrodes are moved away from their welding position, said power supply switch when closed, supplying power from said means to provide power to said transformer; a rectifier; connections for supplying power through said power supply switch when closed to said rectifier, a solenoid operated switch having a pair of normally closed contacts completing the circuit from said power supply means to said transformer, said contacts when opened breaking the circuit to said welding transformer, said solenoid operated switch having an operating solenoid coil connected to said rectifier; a condenser connected in shunt to said solenoid coil; a series of timing resistors adapted to be connected sequentially in series with said shunting capacitor; a series of heating current controlling resistors adapted to be connected sequentially in series with said transformer; and, a switching system responsive to the successive opening and closing of said power supply switch for sequentially connecting into circuit different combinations of said timing and heat controlling resistors and to repeat the sequential connection of said combinations after completion of a sequence of welds.

2. Welding apparatus comprising welding electrodes adapted to be moved into contact with parts to be welded; a transformer for supplying welding current to the electrodes; means to provide alternating current power; a power supply switch, uni-controlled with said electrodes so as to be closed when said electrodes are moved into welding position and opened when said electrodes are moved away from their welding position, said power supply switch when closed, supplying power from said means to provide power to said transformer; a rectifier; connections for supplying power through said power supply switch when closed to said rectifier, a solenoid operated switch having a pair of normally closed contacts completing the circuit from said power supply means to said transformer, said contacts when opened breaking the circuit to said welding transformer, said solenoid operated switch having an operating solenoid coil connected to said rectifier; a condenser connected in shunt to said solenoid coil; a series of timing resistors adapted to be connected sequentially in series with said shunting capacitor; a series of heating current controlling resistors adapted to be connected sequentially in series with said transformer; and, a switching system responsive to the successive opening and closing of said power supply switch for sequentially connecting into circuit different combinations of said timing and heat controlling resistors and to repeat the sequential connection of said combinations after completion of a sequence of welds; said switching system including electromagnetically-operated relays and a stepping switch, said stepping switch being set up for a new operative position whenever said power supply switch is closed and further, said stepping switch moving into a new operative position whenever said power supply switch is opened.

3. Welding apparatus comprising welding electrodes adapted to be moved into contact with parts to be welded; a transformer for supplying welding current to the electrodes; means to provide alternating current power; a power supply switch, uni-controlled with said electrodes so as to be closed when said electrodes are moved into welding position and opened when said electrodes are moved away from their welding position, said power supply switch when closed, supplying power from said means to provide power to said transformer; a rectifier; connections for supplying power through said power supply switch when closed to said rectifier, a solenoid operated switch having a pair of normally closed contacts completing the circuit from said power supply means to said transformer, said contacts when opened breaking the circuit to said welding transformer, said solenoid operated switch having an operating solenoid coil connected to said rectifier; a condenser connected in shunt to said solenoid coil; a series of timing resistors adapted to be connected sequentially in series with said shunting capacitor; a series of heating current controlling resistors adapted to be connected sequentially in series with said transformer; and, a switching system responsive to the successive opening and closing of said power supply switch for sequentially connecting into circuit different combinations of said timing and heat controlling resistors and to repeat the sequential connection of said combinations after completion of a sequence of welds; said switching system including electromagnetically-operated relays and a stepping switch, said stepping switch being set up for a new operative position whenever said power supply switch is closed and further, said stepping switch moving into a new operative position whenever said power supply switch is opened. and manually operated switches operating when actuated to repeat a weld with the combination of timing and heating resistors in circuit prior to operation of said manually operated switches.

4. In a welder of the type which is first energized and then automatically timed to deenergization the combination comprising a welding circuit, an on switch and an off switch coupled to control said welding circuit, an impedance controllable timer circuit coupled to actuate said off switch, a plurality of welding control impedances and associated timer control impedances, step actuatable sequence switch means for coupling a separate welding control impedance into said welding circuit and an associated timer conrtol impedance into the timer circuit for each sequence step, means for advancing said sequence switch to the next step after each actuation of the off switch, and means for actuating said sequence switch to repeat the last sequence step.

5. In a welder of the type which is first energized and then automatically timed to deenergization the combination comprising a welding circuit, an on switch and an off switch coupled to control said welding circuit, an impedance controllable timer circuit coupled to actuate said off switch, a plurality of welding control impedances and associated timer control impedances, step actuatable sequence switch means for coupling a separate welding control impedance into said welding circuit and an associated timer control impedance into the timer circuit for each sequence step, means for advancing said sequence switch to the next step after each actuation of the off switch.

References Cited in the file of this patent
UNITED STATES PATENTS

| | | |
|---|---|---|
| 2,660,654 | Riley et al. | Nov. 24, 1953 |
| 2,734,133 | Riley | Feb. 7, 1956 |
| 2,769,080 | Welch | Oct. 30, 1956 |